United States Patent Office 2,709,316
Patented May 31, 1955

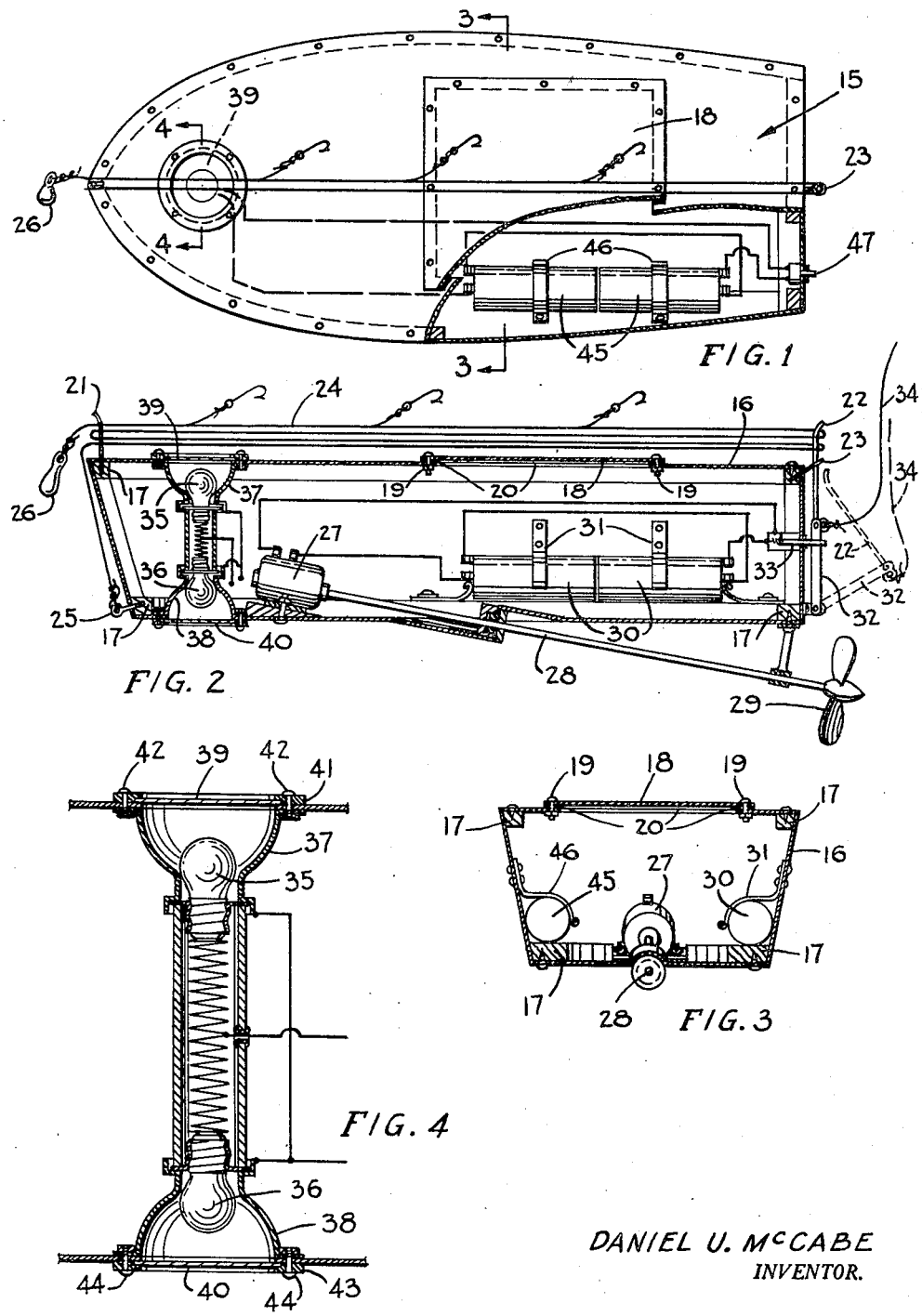

2,709,316

FISHING BUOY

Daniel U. McCabe, Shawnee, Okla.

Application July 13, 1954, Serial No. 442,979

1 Claim. (Cl. 43—26.1)

This invention relates to fishing buoys.

An object of the invention is to provide a fishing buoy which, under control from the shore, may be made to move out on a body of water and there drop a fishing line.

Another object of the invention is to provide a fishing buoy which enables an individual to fish at a considerable distance from shore without having to use a boat or cast his line over or through trees and undergrowth growing along the water's edge.

Other objects and advantages of the invention will appear from the following description considered in conjunction with the attached drawing, in which:

Figure 1 is a plan view of the buoy of the present invention, with parts broken away to illustrate portions of the interior thereof;

Figure 2 is a side elevational view, in section, of the assembly of Figure 1;

Figure 3 is a view taken substantially along line 3—3 of Figure 1; and

Figure 4 is a view taken along line 4—4 of Figure 1 on an enlarged scale.

Referring to the drawings now in more detail, the reference numeral 15 designates a hollow body shaped in the form of a boat and adapted to float in the water. The body or boat 15 consists of a water-tight shell 16 supported upon a frame 17. The shell 16 has a removable panel 18 in its upper surface which permits access to the interior of the boat 15. The panel 18 is tightly secured upon the upper surface of the boat 15 by nuts and bolts 19 and a gasket 20 is interposed between the marginal portions of the panel and the underlying portion of the upper surface of the boat 15 to make the closure water-tight.

Upstanding fingers 21 and 22 project above the top of the boat 15 adjacent each end thereof. The finger 21 has its lower end fixed in the frame 17 of the boat 15. The finger 22 is movable and extends slidably through an eye 23 projecting exteriorly of the boat 15 adjacent the finger 22 and the lower end of the finger 22 is connected to an element of the buoy yet to be described. Arranged in a plurality of loops about the fingers 21 and 22, is a fishing line 24 having one end secured to the boat 15, by means of an eye 25 and having the other end weighted as shown at 26 and extending over the side of the boat adjacent the finger 21.

Propelling means are provided for the boat 15, consisting of an electric motor 27, mounted within the boat 15, from which a shaft 28 extends exteriorly of the bottom of the boat 15 and is provided with a propeller 29 upon its exterior end. The motor 27 is driven from batteries 30 mounted within the boat 15 upon brackets 31.

For connecting and disconnecting the propelling means, an actuator or switch 32 is provided. The actuator 32 is connected to the boat 15 for movement from the connecting position, as shown in solid lines in Figure 2, to a non-connecting position, as shown in broken lines in Figure 2. The actuator 32 is a knife-type switch, the blade of which is frictionally received between the spaced contacts 33 when the switch is in the closed or connecting position as shown in the solid lines in Figure 2. When in the connecting position, the actuator 32 completes the circuit between the batteries 30 and the motor 27 causing the rotation of the propeller 29. To the free end of the actuator 32 is pivotally connected the lower end of the finger 22, the finger 22 thus being in the line engaging position shown in the solid lines in Figure 2 when the actuator is in the connecting position and being moved out of engagement with the loops of the line 24, as shown in the broken lines in Figure 2 when the actuator 32 is moved to the non-connecting position.

Exteriorly of the boat 15, is a hand line 34 having one end connected to the free end of the actuator 32 for effecting the movement of the actuator 32 from its connecting to its non-connecting position. The other end of the line 34 is adapted to be held by an individual standing on the shore and when pulled sharply will cause the actuator 32 to move from the connecting to the non-connecting position and, at the same time cause the finger 22 to move from the engaging to the non-engaging position.

A pair of electric light bulbs 35 and 36 are mounted within the boat 15 in such a manner that the bulb 35 shines upwardly through the top of the boat 15 and the bulb 36 shines downwardly through the bottom of the boat 15. The bulb 35 is surrounded by a reflector 37 which has its upper edge flush with the top of the boat 15 and is covered by a lens 39. The lens 39 is secured to the top of the boat 15 by a water-tight seal 41 which extends around the periphery of the lens 39 and is held in place by bolts 42 which also secure the flanged upper end of the reflector 37 to the top of the boat 15. Similarly the bulb 36 is surrounded by the reflector 38 which is closed by the lens 40, the lens 40 being sealed to the bottom of the boat 15 by a sealing ring 43 held in place by bolts 44 which also secure the flanged edge of a reflector 38 to the bottom of the boat 15. Electrical current is supplied to the bulbs 35 and 36 from batteries 45, within the boat 15 and secured thereto by brackets 46. The circuit between the batteries and the bulbs 35 and 36 includes a hand actuable switch 47, projecting exteriorly of the boat 15, by which the lights may be controlled.

When the fishing buoy of the present invention is not in use, the actuator 32 will be in the non-connecting position so that the propelling means will not be actuated. To prepare the buoy for use, the fisherman will first loop the fishing line 24 about the finger 21 with the loops extending longitudinally of the boat 15 and the weighted end 26 of the line 24 overhanging the boat 15 adjacent the finger 21. If the buoy is to be used at night, the fisherman will then turn on the lights 35 and 36 by actuating the hand switch 47. When the fisherman is ready to place the buoy in the water, the fisherman will insert the upper end of the finger 22 through the eye 23 and the adjacent ends of the loops of the fishing line 24 and push the actuator 32 into the connecting position. The propeller 29 will then begin to turn and if the buoy is dropped into the water, will drive the boat 15 longitudinally through the water. When the fisherman puts the boat 15 into the water, he will retain in his hand the free portion of the hand line 34 and by means of this line may control the distance the boat may move from shore. As the boat moves out over the body of water, the fisherman may keep constant track of its position by reason of the upwardly directed beam of light from the bulb 35. When the boat 15 reaches the desired position upon the body of water, the fisherman will give the hand line 34 a sharp jerk to pull the actuator 32 out of contact with the contacts 33, thus stopping the operation of the propeller 29 and allowing the boat 15 to come to rest at the desired spot upon the body of water.

As the actuator 32 is pulled to the non-connecting position, the finger 22 is, at the same time, slidably disengaged from the loops of the fishing line 24 and the line 24 slides overboard under the urging of the weighted end 26. The line 24 is thus suspended in the water at the desired spot and the beam from the bulb 36, being directed downwardly into the water, will illuminate the line 24 and attract fish to it. When a bite is obtained upon the line 24, the fisherman will be immediately apprised by the sudden jerking movements of the upwardly directed beam of light from the bulb 35 and will also feel the pull upon the hand line 34. He will then, by the manipulation of the line 24, play the fish to set the hook in its mouth and then draw the boat 15, the line 24 and the fish engaged upon the line 24 to the edge of the water where he has been standing to control the operation of the buoy. When the fish has been taken from the line, the line may be relooped and the buoy permitted to move out on the body of water. If the batteries need to be replaced or any repairs need to be made to the mechanism of the buoy, the interior of the boat 15 may be easily reached by the removal of the panel 18.

As the foregoing description will indicate, the use of the buoy of the present invention will enable a fisherman to drop his line at a selected point at a considerable distance from the edge of a body of water without being required to get into a boat or to attempt to cast his line out from the shore and running the risk of having it become entangled in the thick growth of trees and shrubs which frequently surrounds the water's edge. The buoy is light and easy to carry to and from the fishing grounds, it is inexpensive and easy to keep in operation, using the easily obtained standard dry cells and it increases enormously the area in which a fisherman operating from the shore may have the choice of lowering his line.

What is claimed is:

A fishing buoy comprising a hollow body shaped in the form of a boat and adapted to float in the water, upstanding fingers projecting above the top of the boat one adjacent each end thereof, one of said fingers being fixed and the other of said fingers being movable, a fishing line having a portion upon the top of the boat arranged in a plurality of loops about said fingers, said line having one end secured to said boat and having the other end weighted and extending over the side of the boat adjacent said one finger, propelling means for said boat, batteries for driving said propelling means, an actuator for connecting and disconnecting said propelling means and said batteries connected to said boat for movement from a connecting position to a non-connecting position, the other of said fingers being movable out of engagement with said loops in response to movement of said actuator from its connecting to its non-connecting position, and a hand line exteriorly of said boat and having one end connected to said actuator for effecting the movement of said actuator from its connecting to its non-connecting position.

References Cited in the file of this patent

UNITED STATES PATENTS

| 1,850,296 | Vermeulen | Mar. 22, 1932 |
| 1,918,507 | Westling | July 18, 1933 |

FOREIGN PATENTS

| 760,229 | France | Jan. 3, 1934 |